United States Patent
Kato et al.

(10) Patent No.: US 6,674,830 B2
(45) Date of Patent: Jan. 6, 2004

(54) NUCLEAR REACTOR PLANT (75) Inventors: Yasuyoshi Kato, Tokyo (JP); Takeshi Nitawaki, Kanagawa (JP)

(73) Assignee: President of Tokyo Institute of Technology, Tokyo (JP)

(*) Notice: Subject to any disclaimer, the term of this patent is extended or adjusted under 35 U.S.C. 154(b) by 0 days.

(21) Appl. No.: 10/173,038

(22) Filed: Jun. 18, 2002

(65) Prior Publication Data

US 2003/0091141 A1 May 15, 2003

(30) Foreign Application Priority Data

Mar. 9, 2001 (JP) .................................. 2001-241499

(51) Int. Cl.[7] ............................................. G21C 15/253
(52) U.S. Cl. ..................... 376/391; 376/383; 376/361; 376/402; 376/211; 376/904; 60/644.1; 60/647
(58) Field of Search .................................. 376/361, 383, 376/402, 211, 391, 904; 60/644.1, 647

(56) References Cited

U.S. PATENT DOCUMENTS

| | | | |
|---|---|---|---|
| 3,503,208 A | | 3/1970 | Schmidt ......................... 60/36 |
| 3,579,982 A | | 5/1971 | Strub ............................. 60/36 |
| 3,583,156 A | * | 6/1971 | Schabert ....................... 376/391 |
| 3,607,636 A | * | 9/1971 | Nageler et al. .............. 376/391 |
| 3,697,372 A | * | 10/1972 | Schabert ....................... 376/391 |
| 3,742,707 A | * | 7/1973 | Andrews et al. ............. 376/394 |
| 3,937,652 A | * | 2/1976 | George ......................... 376/298 |
| 4,293,384 A | * | 10/1981 | Weber .......................... 376/391 |
| 4,413,348 A | * | 11/1983 | Kapich ......................... 376/367 |
| 4,466,249 A | * | 8/1984 | Frutschi ........................ 60/648 |
| 5,431,016 A | * | 7/1995 | Simpkin ....................... 60/650 |

FOREIGN PATENT DOCUMENTS

| | | | |
|---|---|---|---|
| CH | 308261 | * | 7/1971 |
| DE | 1564655 | * | 1/1970 |
| DE | 1614620 | * | 10/1970 |
| DE | 2144445 | * | 3/1973 |
| FR | 2042581 | * | 2/1971 |
| GB | 1177467 | * | 1/1970 |
| GB | 1232959 | * | 5/1971 |
| JP | 46-9764 | | 3/1971 |
| JP | 46-10961 | | 3/1971 |
| JP | 2001-330692 | * | 5/2000 |
| JP | 2001-330692 | | 11/2001 |
| NL | 6909825 | * | 11/1970 |

OTHER PUBLICATIONS

Kato et al, Direct cycle Fast Reactor, Bull. Res. Lab. Nucl. Reactor, vol 24, 2000.*

(List continued on next page.)

Primary Examiner—Michael J. Carone
Assistant Examiner—John Richardson
(74) Attorney, Agent, or Firm—Sughrue Mion, PLLC (57) ABSTRACT

The subject of the present invention is to provide a nuclear reactor plant of which is a direct cycle nuclear reactor using a carbon dioxide as a coolant such that a heat evacuation for liquefying coolant is reduced while a compressive work is reduced by using a condensation capability of a carbon dioxide for enhancing a cycle efficiency.

The nuclear reactor plant is comprised of a nuclear reactor 1, a turbine 2, and wherein, the coolant of supper critical state is heated by a heat of a nuclear reactor to directly drive a turbine, a gaseous coolant discharged from said turbine is chilled and compressed after said turbine is driven for keeping in a critical state, and then said coolant is circulated again into said nuclear reactor, and wherein, a carbon dioxide is used as said coolant, and a predetermined ratio of gaseous coolant discharged from said turbine is liquefied for being compressed in a liquid state while a rest of gaseous coolant is compressed in a gaseous state.

4 Claims, 5 Drawing Sheets

OTHER PUBLICATIONS

Dostal et al, A supercritical CO2 Brayton cycle for advanced reactor applications, pp. 110 to 111., Nov. 2001.*

Kato et al Titan program and direct cycle fast reactor, Japan–Korea seminar, special issue, vol 3 (2000), pp. 20 to 23.*

Dostal et al A supercritical CO2 gas turbine power cycle for next–generation nuclear reactors, ICONE 10–22192, pp. 567 to 574.*

Tom et al, The feasibility of cooling heavy–water reactors with supercritical fluids, Nuclear Engineering Design 53 (1979) 187–196.*

Vesovic et al Transport properties of CO2, J. Phys. Chem. Ref. data, vol 19, No 3 1990 pp. 763 to 811.*

Span et al, New equation on the state of CO2 covering the fluid region from triple–point temperature to 1100K at pressure up to 800 MPa, J. Phys. Chem. Ref. Data vol 25, No. 6, 1996, pp. 1509 to 1610.*

GE. Co., Comparative study and evaluation of advanced–cycle systems, final report, NTIS Feb. 1978, EPRIAF664V2PT1.*

* cited by examiner

(Note) Temperature difference of regenerative heat exchanger II (°C) = ( T8 − T2 )

Regenerative heat exchanger II

NUCLEAR REACTOR PLANT

BACKGROUND OF THE INVENTION

1. Field of the Invention

The present invention relates to a nuclear reactor plant.

2. Prior Art

A gas such as helium can be considered as a coolant in a direct cycle nuclear reactor wherein a turbine is directly driven by the coolant heated in the nuclear reactor. However, the nuclear reactor can hardly be operated by helium because helium is inferior in cooling capability. Therefor, power density of the nuclear reactor can not help reducing. Accordingly, a core volume is required to be expanded to gain a large amount of power generative output. Consequently, a problem had been arisen such that the production cost is increased in response to an increase of the amount of materials for the nuclear reactor plant.

Carbon dioxide can be considered as a gaseous coolant in the direct cycle nuclear reactor instead of helium. Because carbon dioxide of super critical state has a couple of times as much cooling capability (heat transmission ratio and heat transportation power) as gaseous helium, etc., have. Thus, this allows the nuclear reactor to be operated in higher temperature compared with the case when helium is used as the coolant even though carbon dioxide is not condensed. Consequently, the nuclear reactor can be miniaturized.

Moreover, both temperature and pressure of a critical point of carbon dioxide (approximately 304K and 7.4 MPa) are higher than that of helium (approximately 5.2K and 0.2 MPa).

However, the coolant (carbon dioxide) is discharged from the turbine after said turbine is driven, and the coolant is compressed to around the critical point (the area out of ideal gas characteristic) in the direct cycle nuclear reactor wherein carbon dioxide is used as the coolant. Thus a compressive work can be drastically reduced compared with the case when helium is used as the coolant.

Accordingly, when a direct cycle nuclear reactor is constituted by using gaseous carbon dioxide as the coolant, output density of the nuclear reactor can be improved compared with the case when helium is used as the coolant. Consequently, this causes the nuclear reactor plant to be miniaturized for reducing construction cost.

However, even though carbon dioxide is used as the coolant in the direct cycle nuclear reactor (hereinafter is referred to as "non-condensation cycle reactor") such that the coolant is circulated under the gaseous state, the temperature of coolant at inlet of the turbine must be high temperature (approximately 700 C°) to gain high cycle efficiency since working volume is so large to compress the gaseous coolant. Consequently, both system and equipment are greatly heated for causing a problem such as being restricted to the selection of materials for the nuclear reactor.

In order to solve the above problem, the inventors suggested a direct cycle fast reactor using Rankine cycle utilized condensation ability of carbon dioxide (Patent Application No.2000-148151).

The direct cycle fast reactor disclosed in the Patent Application No.2000-148151 will be now described with reference to the accompanying drawing of FIG. 5.

Figure 5:
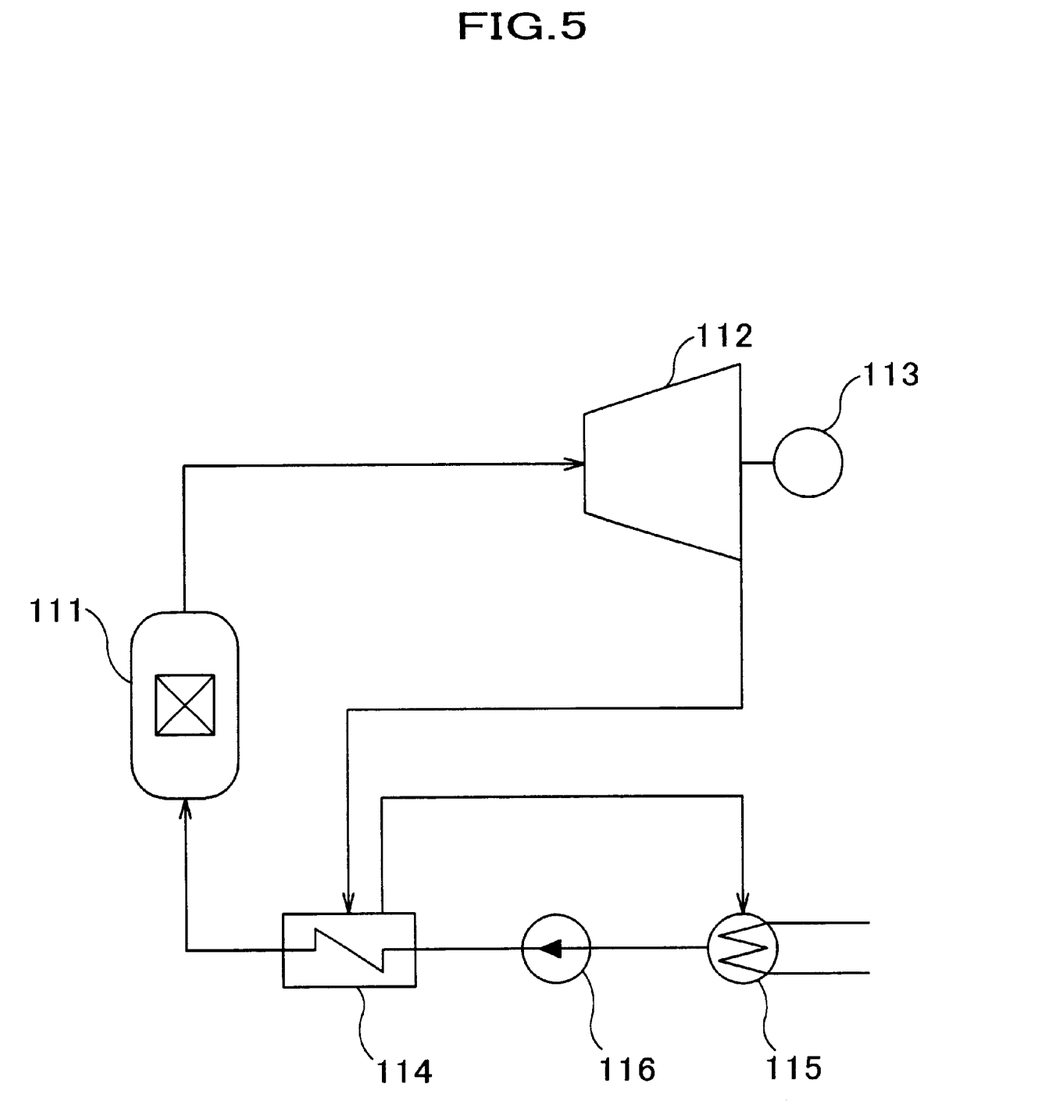
FIG. 5 is a structural view of a conventional nuclear reactor.

The direct cycle fast reactor shown in FIG. 5 has a nuclear reactor 111, a turbine 112, and a power generator 113. Furthermore, a regenerative heat exchanger 114, a condenser 115, and a pump 116 are provided between outlet of the turbine 112 and inlet of the nuclear reactor 111.

Besides, arrows in the figure indicate current directions of the coolant in the direct cycle fast reactor.

The coolant (carbon dioxide) in a super critical state is heated in the core of the nuclear reactor 111 for being directly introduced to the turbine 112. And then the turbine 112 is driven for driving the power generator 113, which is connected with the turbine 112. The coolant discharged from the turbine 112 becomes gaseous state to be introduced into the condenser 115 via the regenerative heat exchanger 114.

The condenser 115 has cooling water, etc., introduced from outside for allowing the coolant to be chilled. Consequently, full amount of the coolant is liquefied.

The liquefied coolant is transferred to the regenerative heat exchanger 114 by the pump 116 for being pressurized to be more than a critical pressure through heat exchanging with said coolant discharged from the turbine 112 to be increased to the temperature at inlet of the nuclear reactor 111. The coolant being increased to the supper critical state in this manner is transferred to the core of the nuclear reactor 111 to be reheated.

An electric power is generated by continuous driving of the power generator through repeating above process.

Carbon dioxide as the coolant of the condenser 115 is fully condensed in the direct cycle fast reactor of the Patent Application 2000-148151.

Certainly the coolant is liquefied in the direct cycle fast reactor. Compression for gaseous coolant performed in a non-condensation cycle reactor can be replaced with compression for a liquid coolant having a small specific volume. Therefore, a compressive work of the coolant can be reduced.

Besides, a direct cycle nuclear reactor described in the Patent Publication No.2000-148151 such as liquefying full amount of the coolant is sometimes called "a full condensation cycle reactor". However, when the full condensation cycle reactor can not sufficiently chill the coolant to be less than a critical temperature [approximately 304K (31° C.)] in the condenser 115, a pressure evacuation from the turbine 112 is increased since a saturated vapor pressure is increased. Accordingly, since the coolant can not be sufficiently expanded in the turbine 112 and a work volume to drive the turbine 112 is reduced, a heat evacuation discharged from the condenser 115 is relatively increased. Consequently, new problem will be arisen such that a cycle efficiency is not improved so much.

The present invention has been made with the forgoing background in mind. The present invention is to provide the direct cycle nuclear reactor wherein carbon dioxide is used as the coolant, and the coolant directly rotates the turbine for generating the electric power. Also the nuclear reactor of the present invention is characterized in that the heat evacuation caused by liquefying the coolant can be reduced while the compressive work can be reduced by using condensation ability of carbon dioxide. Accordingly, the subject of the present invention is to provide the nuclear reactor plant enhancing the cycle efficiency than ever by taking above mentioned characteristic.

SUMMARY OF THE INVENTION

The present invention is comprised as follows to solve the aforementioned subject.

The present invention according to the following claim 1 is a nuclear reactor plant having a nuclear reactor and a turbine, and is characterized in that a coolant in a super critical state is heated by the heat of the nuclear reactor, said heated coolant directly drives the turbine, and a gaseous coolant discharged from said turbine is chilled and compressed for being in a critical state after said turbine is driven, and then the coolant is circulated again into said nuclear reactor, and is also characterized in that carbon dioxide is used as said coolant, and a predetermined ratio of the gaseous coolant discharged from said turbine is liquefied for being compressed in a liquid state, while a rest of gaseous coolant is compressed in a gaseous state.

As described in prior art, a full condensation cycle reactor can reduce a compressive work of the coolant since carbon dioxide using as the coolant is fully condensed for liquefying. However, if the coolant can not be sufficiently low temperature, a heat evacuation (hereinafter is referred to as "heat evacuation from acondenser") wastefully discharged from a condenser is increased for degrading a cycle efficiency of a nuclear reactor plant.

Therefore, the present invention relates to the nuclear reactor such that a compressive work of the coolant can be reduced to solve disadvantage of a non-condensation cycle reactor while a heat evacuation form a condenser can be reduced to solve disadvantage of the full condensation cycle reactor by compressing a part of coolant in gaseous state as well as rest of coolant in a liquid state.

Consequently, the cycle efficiency of the nuclear reactor plant could be more improved than that of both the non-condensation cycle reactor and the full condensation cycle reactor.

Besides, a ratio of being liquefied in the coolant discharged from the turbine is sometimes called "a condensation ratio"

The present invention according to the following claim 2 is the nuclear reactor plant as set forth in the following claim 1, comprising a first regenerative heat exchanger (hereinafter is referred to as the regenerative heat exchanger I), a second regenerative heat exchanger (hereinafter is referred to as the regenerative heat exchanger II), a first compressor (hereinafter is referred to as the compressor I), a second compressor (hereinafter is referred to as the compressor II), the condenser and a pump provided between outlet side of said turbine and inlet side of said nuclear reactor, and wherein full amount of the coolant in gaseous state discharged from said turbine is chilled by passing through the regenerative heat exchanger I and the regenerative heat exchanger II for being compressed by the compressor I, and then said full amount of the coolant is divided into said predetermined ratio of the coolant and said rest part of the coolant, said predetermined ratio of the coolant is introduced into said condenser for being liquefied and then is compressed to be more than a critical pressure by the pump and kept in a super critical state to be introduced into said regenerative heat exchanger II, while said rest part of the coolant is introduced into the compressor II for being compressed to be more than a critical pressure in gaseous state and kept in a super critical state, and then said predetermined ratio of the coolant and said rest part of the coolant are mixed with each other for being introduced into said nuclear reactor via said regenerative heat exchanger I.

The present invention according to the following claim 3 is the nuclear reactor plant as set forth in claim 1 or 2 characterized in that a fast reactor is applied as said nuclear reactor.

The present invention according to the following claim 4 is the nuclear reactor plant as set forth in claim 1 or 2 characterized in that a thermal reactor is applied as said nuclear reactor.

When the nuclear reactor plant with regard to the present invention is applied to the thermal reactor, a cycle efficiency (approximately 45%) can be gained under the condition that temperature of the coolant at outlet of the nuclear reactor is not so high (approximately 650° C.). Said cycle efficiency is the same as it is the case when the temperature at outlet of the coolant is 900° C. in a gas reactor of high temperature (PBMR) which is a direct cycle nuclear reactor using helium as the coolant.

When carbon dioxide is used as the coolant, carbon dioxide gas expanded in a gas turbine can be compressed in around a critical temperature. In addition, when the nuclear reactor is a partial condensation cycle reactor, the coolant (carbon dioxide) can be pressurized under the condensed liquid state until the coolant is returned to a core. Consequently, a cycle efficiency, such as it is higher than that of a direct cycle reactor of conventional helium gas turbine, can be gained.

Similarly, when the nuclear reactor plant according to the present invention is applied to a fast reactor, the cycle efficiency (approximately 40%) can be gained under the condition that outlet temperature of the coolant in the nuclear reactor is the same as that of a conventional sodium cooling fast reactor (approximately 530° C.)

When the present invention is applied to these ones, higher efficiency can be gained than that of a conventional thermal reactor or the fast reactor. Further, the same efficiency can be gained as that of the conventional reactor even in lower temperature.

DESCRIPTION OF THE PREFERRED EMBODIMENTS

Following is a detailed explanation of the present invention with reference to drawings.

Figure 1:
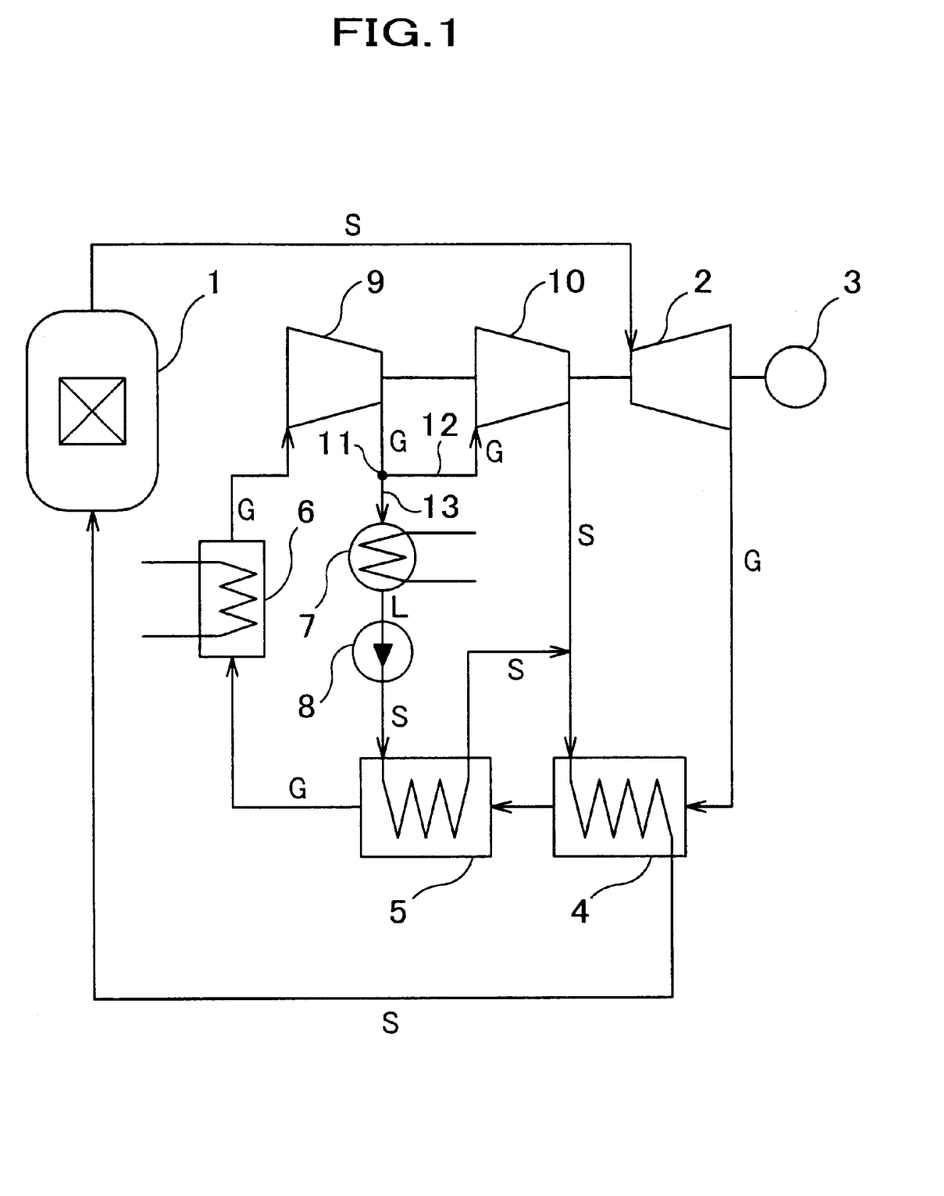
FIG. 1 is a structural view of the nuclear reactor plant with regard to the present invention.

FIG. 1 is a structural view showing a preferred embodiment of the nuclear reactor plant with regard to the present invention.

Figure 3:
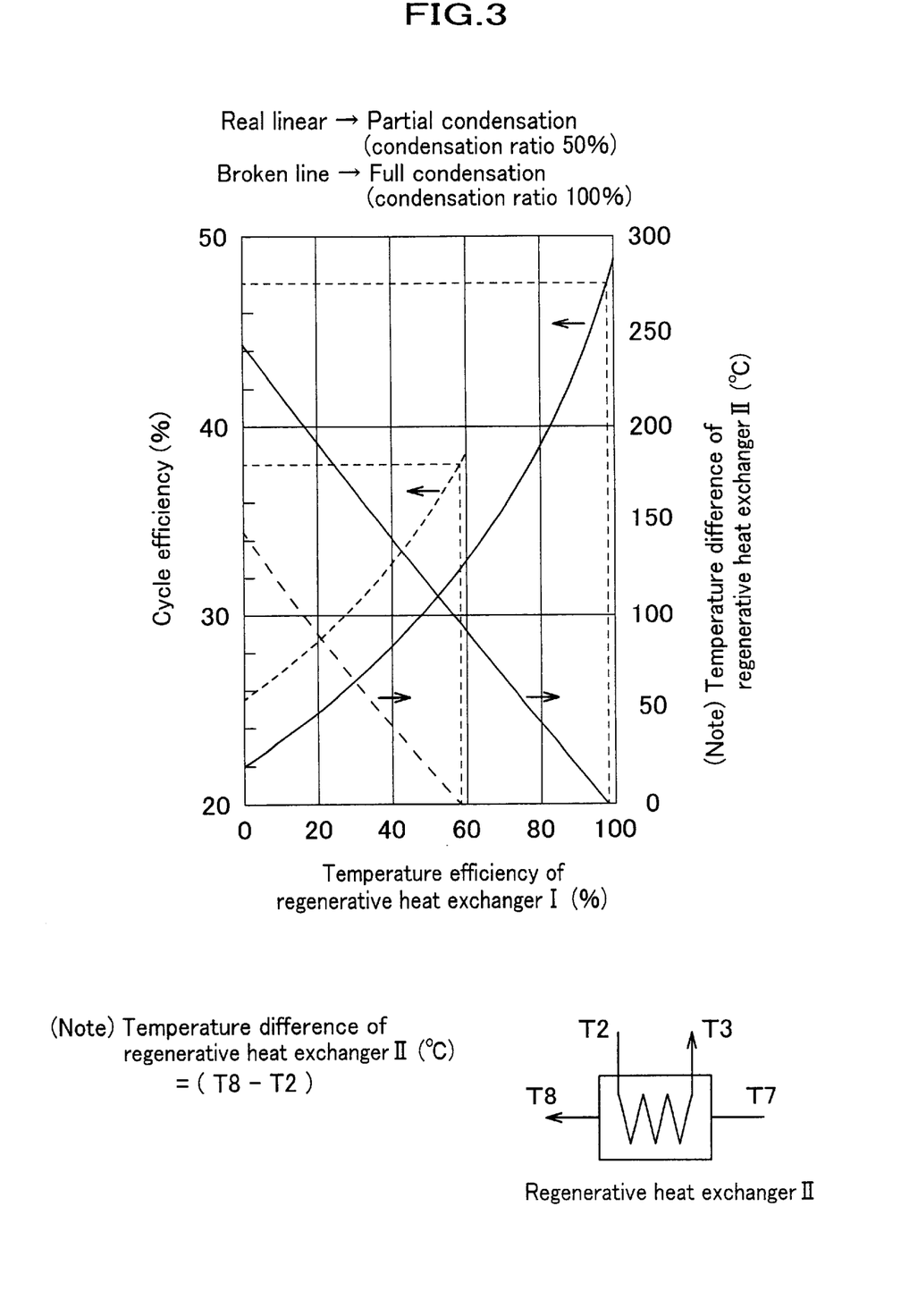
FIG. 3 is a diagram showing relation between condensation ratio and cycle efficiency of the coolant in the nuclear reactor plant with regard to the present invention.
Figure 4:
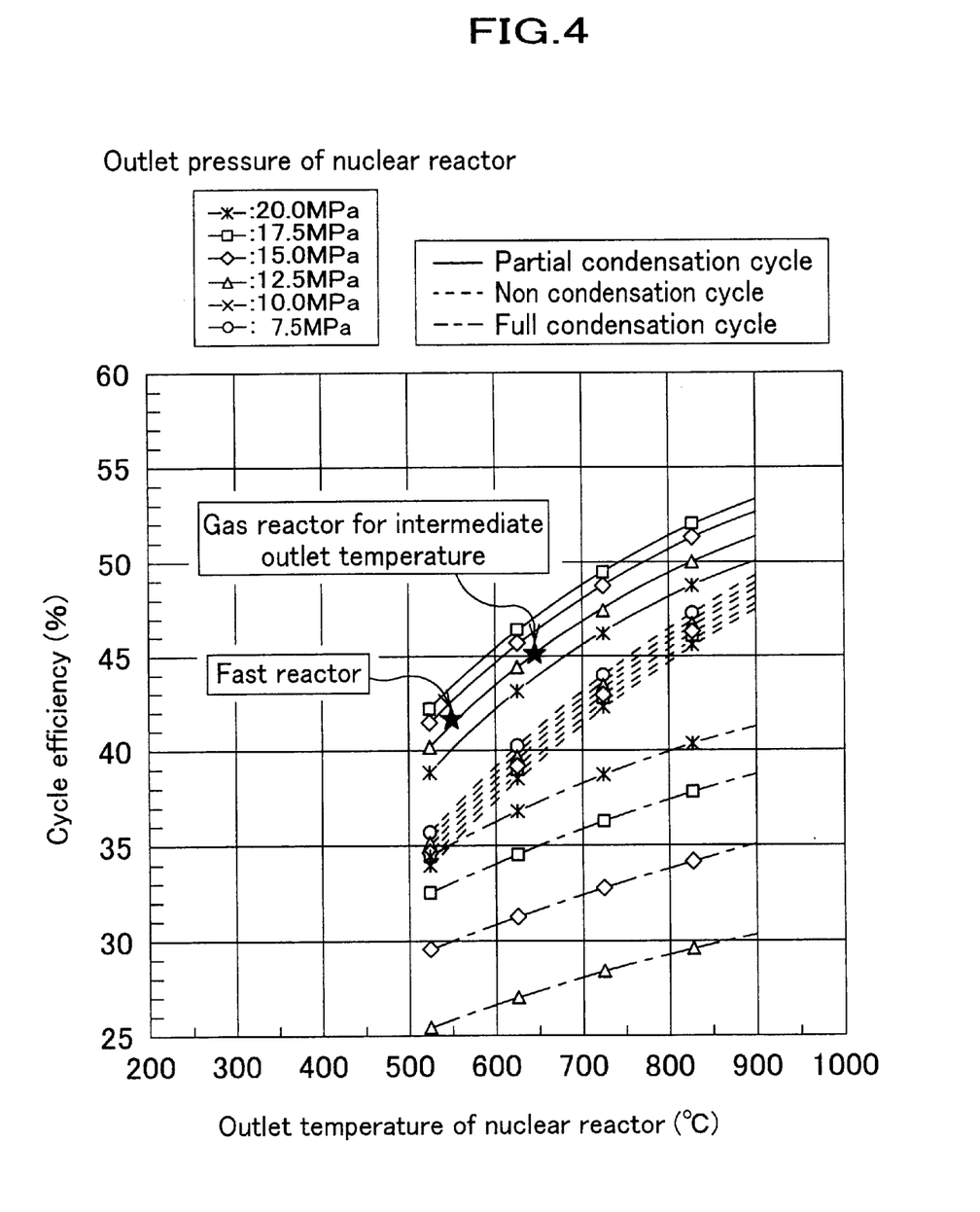
FIG. 4 is a diagram of comparing the cycle efficiency of the non-condensation cycle reactor, the full condensation cycle reactor, and the nuclear reactor plant of the present invention.

FIG. 2 is T-S diagram showing a cycle of the coolant of the nuclear reactor plant with regard to the present invention. FIG. 3 is a diagram showing a relation between a condensation ratio of the coolant and a cycle efficiency. FIG. 4 is a diagram of comparing the cycle efficiency of the non-condensation cycle reactor, the full condensation cycle reactor and the nuclear reactor plant of the present invention.

A Constitution of a Nuclear Reactor Plant

A nuclear reactor plant showing in FIG. 1 comprises the nuclear reactor 1, a turbine 2 and a power generator 3. Furthermore, first regenerative heat exchangers I4 (I means first regenerative heat exchanger and it is shown only as reference number 4 in FIG. 1) and II5 (II means second regenerative heat exchanger heat exchanger and it is shown only as reference numeral 5 in FIG. 1) a preliminary cooling system 6, a condenser 7, a pump 8, condensers I9 (I means first condenser and it is shown only as reference number 9 in FIG. 1) and II10 (II means second condenser and it is shown only as reference number 10 in FIG. 1) are provided between outlet side of the turbine 2 and inlet side of the nuclear reactor 1.

Besides, arrows in figure indicate a current direction of the coolant in the present cycle. Also, carbon dioxide is premised being used as the coolant. Further, codes of "G", "L", and "S" described along arrows show a state of the coolant in a cooling pipe for indicating gas state, liquid state, and the super critical state, respectively.

The coolant of super critical state heated in a core of the nuclear reactor 1 is directly introduced into the turbine 2 for rotating the turbine 2. This causes the power generator 3 to be driven. The coolant discharged from the turbine 2 becomes liquid state for being pressurized to be the same pressure as saturation vapor pressure of condensation temperature of the condenser 7 in the compressor I9 (see reference numeral 9 in FIG. 1) after being chilled in the regenerative heat exchanger I4 (see reference numeral 4 in FIG. 1), the regenerative heat exchanger II5 (see reference numeral 5 in FIG. 1), and the preliminary cooling system 6.

And then, the coolant is divided into a predetermined ratio (condensation ratio) in a fork 11. The one is absorbed by the pump 8 for being introduced into the condenser 7 via a cooling pipe 13 to be chilled, condensed, and liquefied. In the meantime, the other is pressurized to be more than a critical pressure in the compressor II10 (see reference numeral 10 in FIG. 1) via the cooling pipe 12 under the condition of keeping gaseous state to be super critical state.

As a method of dividing the coolant on the fork 11, it is available for using such that the pump 8, aspiration of the compressor II10 (see reference numeral 10 in FIG. 1), an orifice provided on the cooling pipe 12 and 13, and a flow control valve of the coolant, etc., are combined.

As an example, a method is considered such that the flow control valve (not shown) is provided on the fork 11 of the coolant while a flow meter (not shown) is provided on the cooling pipe 12 and 13 for making minor adjustment of a dividing ratio (condensation ratio) of the coolant based on a signal of the flow meter.

Also another method is considered such that an orifice is provided on either the cooling pipe 12 or 13 instead of said flow control valve.

The coolant such as salt water or the cooling heat for vaporizing liquefied natural gas can be introduced from outside the condenser 7. This allows said coolant introduced in said condenser 7 to be chilled and liquefied.

The liquefied coolant is pressurized to be more than a critical pressure by the pump 8 and kept in super critical state, and then the temperature of the liquefied coolant is increased in the second regenerative heat exchanger 5 through heat exchanging with said coolant discharged from the turbine 2. Sequentially, said liquefied coolant is mixed with the compressed coolant. Herein, the compressed coolant was compressed to the same pressure as that of said liquefied coolant in the compressor II 10 after passing through the cooling pipe 12 by bypassing the condenser 7

Temperature of mixed coolant is raised to around the temperature at inlet of the nuclear reactor 1 in the first regenerative heat exchanger 4 by heat exchanging with said coolant discharged from the turbine 2. The coolant enters into a core of the nuclear reactor 1 for being heated here again. The coolant is gone through said process again for a continuous driving of the power generator 3 to generate an electric power.

The coolant is condensed into liquid by predetermined condensation ratio for shrinking volume in a nuclear reactor plant showing in FIG. 1. Since specific volume of liquid is considerably smaller than that of gas, a compressive power to drive the compressors 9 and 10 for compressing a volume of coolant is reduced. In addition, since volume of condensed coolant is reduced, heat evacuation from the condenser 7 is reduced. These effects allow a cycle efficiency to be more improved than that of a non-condensation cycle reactor and a full condensation cycle reactor.

Besides, a kind of nuclear reactor plant with regard to the present invention such that the coolant is partly condensed, is sometimes called "a partial condensation cycle reactor".

Furthermore, when an evaporated cooling heat of liquefied natural gas is used for cooling in the condenser 7, an evaporated cooling heat, which had been wastefully used previously, can be effectively utilized.

Super critical carbon dioxide has a couple of times higher cooling capability (thermal conductivity and heat transport power) than that of a gas such as helium. Accordingly, a core of high output density can be chilled compared with the case of a direct cycle reactor using helium as the coolant even in a non-condensation cycle reactor, which is not involved in condensing the coolant. Consequently, a nuclear reactor can be miniaturized and a construction cost can be reduced.

What is more, carbon dioxide is condensed as a temperature went down, hence, a condensation cycle could be applied. This allows a compressive work of gas to be reduced for improving a cycle efficiency. Because the compressive work of gas is a large amount of work volume in a non-condensation cycle reactor.

On the other hand, in the case of a full condensation cycle reactor such that carbon dioxide is fully condensed, a compressive work can be reduced. On the contrary, however, when a condensation temperature is not sufficiently low, heat evacuation from a condenser is increased for causing a cycle efficiency to be degraded. Therefore, the present invention is to apply a partial condensation reactor for appropriately setting a condensation ratio. Thus, both disadvantages of a non-condensation cycle reactor having a large amount of compressive work and a full condensation cycle reactor having a large amount of heat evacuation can be solved. Furthermore, a cycle efficiency can be more improved than that of both a non-condensation cycle and a full condensation cycle.

What is more, since a carbon dioxide is chemically inactive for air and water, that is not violently react to air and water in even the case such that carbon dioxide is leaked from a cooling system to outside.

Consequently, the present invention can avoid the problem such that a cooling system and a peripheral facility are damaged by leakage of coolant, which is concerned about the case of using liquid metal sodium as a coolant.

Also, carbon dioxide using in the present invention is a super critical state in a core, hence, this can avoid occurrence of void caused by boiling. Also this can avoid the problem such that over heat in the core is occurred as rate of reaction is increased.

Besides, "super critical carbon dioxide" of the present invention is subject to carbon dioxide being in the condition of more than a critical pressure (7.375 MP).

Furthermore, aforementioned explanation is one of the preferred embodiments, a heat temperature depends upon a constitution, a size and an electric power generation of a specified nuclear reactor.

A Preferred Value of a Condensation Ratio of Coolant

In a nuclear reactor plant with regard to the present invention, a condensation ratio of the coolant can optionally be set within a range from 0 to 100% in principle. The case of 0% of condensation ratio is a non-condensation cycle reactor, while the case of 100% of condensation ratio is a full condensation cycle reactor.

However, in a nuclear reactor plant with regard to the present invention, a condensation ratio of the coolant is required to determine a preferable range to gain higher cycle efficiency than that of both a non-condensation cycle reactor and a full condensation cycle reactor.

A preferred condensation ratio of the coolant can hardy be explained since this is variable depending upon a design parameter of a nuclear reactor plant (each of temperature and pressure in cycle, efficiency of respective equipment, regenerative efficiency of regenerative heat exchanger, ratio of turbine expansion, and pressure loss, etc). However, condensation ratios were tried to be calculated by varying the temperature of coolant at inlet of the turbine and the pressure of coolant at outlet of the turbine based on a value of said design parameter shown in table I <condition of calculation>.

Besides, the temperature of coolant at inlet of the turbine and the pressure of coolant at inlet of the turbine shown in table 1 are the most typical condition of temperature (800 through 1100 K) and pressure (7.5 through 17.5 MPa) respectively.

A condensation ratio is varied from 35.0% (the temperature of coolant at inlet of the turbine: 800K, and the pressure of the coolant at inlet of the turbine: 7.5 MPa) to 64.2% (the temperature of coolant at inlet of the turbine: 1100K, and the pressure of coolant at inlet of the turbine: 17.5 MPa) under the condition of said temperature and pressure.

When a nuclear reactor plant of the present invention is operated, a condensation ratio must be selected so as to produce maximum cycle efficiency by considering a design parameter of conditions for both temperature and pressure of the coolant, etc., of the nuclear plant.

Furthermore, also when the nuclear reactor plant of the present invention is operated under absolutely out of said typical condition, the nuclear reactor plant can be operated by the condensation ratio such that a maximum cycle efficiency can be gained by extrapolating a condensation ratio shown in table 1.

TABLE 1

The temperature and pressure of coolant at outlet of the turbine and a condensation ratio.

|  |  | The temperature of coolant at inlet of the turbine (K) Temperature | | | |
| --- | --- | --- | --- | --- | --- |
| Pressure | | 800 | 900 | 1000 | 1100 |
| The pressure of coolant at inlet of the turbine (MPa) | 7.5 | 35.0% | 41.1% | 46.2% | 50.8% |
|  | 10.0 | 36.3% | 43.0% | 48.5% | 53.5% |
|  | 12.5 | 37.9% | 45.1% | 51.2% | 56.6% |
|  | 15.0 | 39.6% | 47.6% | 54.2% | 60.1% |
|  | 17.5 | 41.4% | 50.3% | 57.7% | 64.2% |

(Note)
A value indicating of "%" in table is a condensation ratio.

<Calculating Condition>
Temperature at outlet of preliminary cooling system: 308K
Condensation temperature of a cooling system; 298K
Expanding ratio of a turbine: 3.5
Heat insulating efficiency of a turbine: 90%
Heat insulating efficiency of a pump: 90%
Heat insulating efficiency of a compressor: 90%
Temperature efficiency of a regenerative heat exchanger I: 90%
Log-mean temperature difference of a regenerative heat exchanger II: 30° C.
Pressure loss for a system: unknown.

The reason why a cycle efficiency is improved in a nuclear reactor plant of the present invention.

The following description with reference to FIG. 2 and FIG. 3 is the reason why a cycle efficiency of a nuclear reactor plant of the present invention is more improved than that of a full condensation cycle reactor.

Figure 2A:
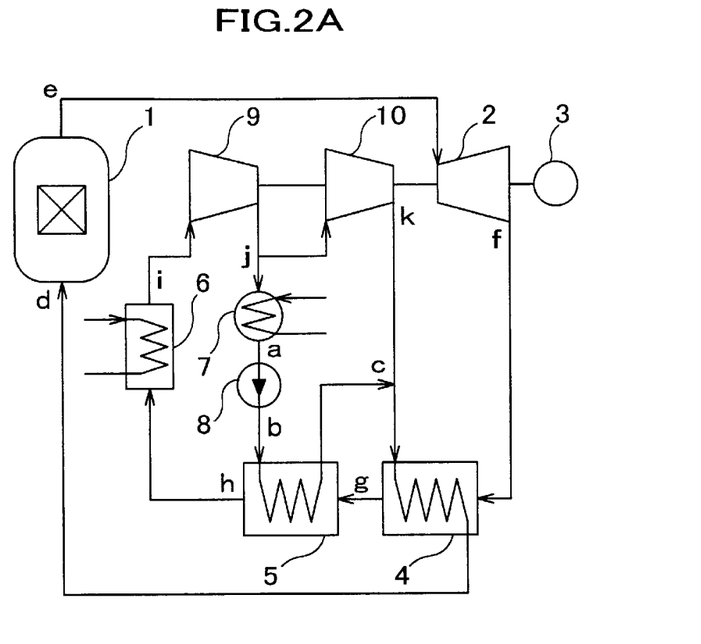
FIG. 2 is T-S curve showing cycle of the coolant in the nuclear reactor plant with regard to the present invention.
Figure 2B:
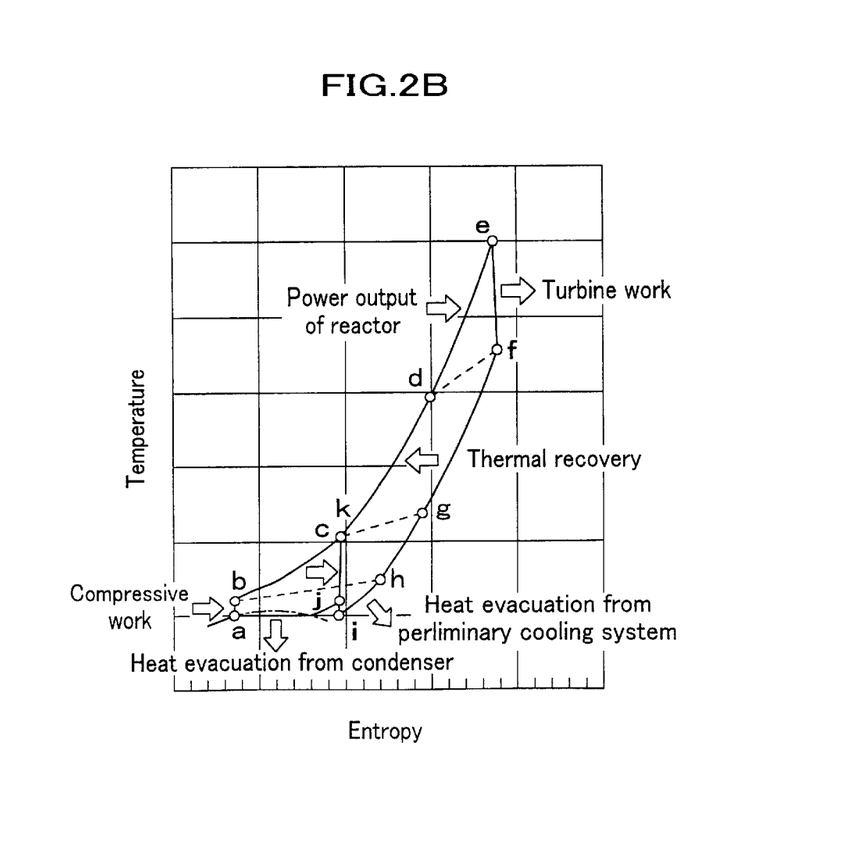

FIG. 2A is a structural view of a nuclear reactor plant with regard to the present invention, FIG. 2B is T-S diagram of the nuclear reactor plant. Besides, the same code as it is in FIG. 1 is marked in FIG. 2A if a part in FIG. 2A is same as it is in FIG. 1 for omitting explanations. Also, a code of a through K marked in T-S diagram in FIG. 2B corresponds to a code marked in side of a cooling pipe of FIG. 2A for indicating both entropy and temperature in each cooling pipes respectively.

In T-S diagram of FIG. 2B, point f is determined by a heat insulting efficiency of the turbine 2, point b is determined by a heat insulting efficiency of the pump 8, and a point c (=point K) is determined by a heat insulting efficiency of the compressor I 9. These points are invariable points in T-S diagram. First of all, full amount of the coolant is considered as being imaginatively condensed under the above constitution (Condensation ratio is 100%). At the same time, when focusing on the regenerative heat exchanger I4 (an area comprised of points f, g, c, and d), as a regenerative efficiency (heat recovery efficiency) of the regenerative heat exchanger 14 is gradually enhanced for enhancing a cycle efficiency, point d goes up and point g goes down since both points c and f are invariable points.

Then, when focussing on the regenerative heat exchanger II5 (an area comprised of points g, h, b, and c), point h is going to gradually go down as point g goes down. However, both points g and h have a lower limit for going down since point b and c are invariable points. In other words, said lower limit for going down is a lower limit for fully condensing. Accordingly, a condensation ratio of the coolant must be gradually reduced to enhance a regenerative efficiency of the regenerative heat exchanger 14.

Taking above things into consideration, the following description with reference to FIG. 3 is the reason why a cycle efficiency of a nuclear reactor plant of the present invention is more improved than that of a full condensation cycle reactor.

In FIG. 3, horizontal axis shows a temperature efficiency of the regenerative heat exchanger I4, the right side of vertical axis shows one example of temperature difference of the regenerative heat exchanger II5 (see "note" in diagram), and the left side of vertical axis shows one example of a cycle efficiency.

With regard to a full condensation (condensation ratio= 100%: broken lines of right side of a vertical axis in figure), when temperature efficiency of the regenerative heat exchanger I4 is gradually increased in this diagram, temperature difference of the regenerative heat exchanger II5 becomes 0 under the condition that a temperature efficiency of the regenerative heat exchanger I4 is approximately 60%. Consequently, the cycle efficiency (broken lines of left side of the vertical axis in figure) is less than 40%. In other words, thermal recovery efficiency by the regenerative heat exchanger I4 can not be enhanced more than this, therefore, more than 40% of cycle efficiency can not be gained.

On the other hand, with regard to a partial condensation (condensation ratio=50%: real linear of right side of vertical axis in diagram), a temperature efficiency of the regenerative heat exchanger I becomes almost 100% when a temperature difference of the regenerative heat exchanger II5 becomes 0. Consequently, also the cycle efficiency (real linear of right side of vertical axis in diagram) becomes approximately 50%.

There is no heat exchanger such that temperature efficiency is actually 100%. However, for example, even though temperature efficiency of the regenerative heat exchanger I4 is suppose to be 80 through 90%, a partial condensation can gain higher cycle efficiency than that of said full condensation (condensation ratio=100%).

SPECIFIED EXAMPLE

The following description with reference to FIG. 4 is the reason why a cycle efficiency of a nuclear reactor plant of the present invention is higher than that of both a non-condensation cycle reactor and a full condensation cycle reactor.

In FIG. 4, horizontal axis shows a temperature of the coolant on outlet for a nuclear reactor while vertical axis shows a cycle efficiency of nuclear reactor. FIG. 4 shows the cycle efficiency of the nuclear reactor plant with regard to each type of the nuclear reactors (a partial condensation cycle reactor of the present invention, the non-condensation cycle reactor, and the full condensation cycle reactor). Besides, each value of the cycle efficiency was calculated by using several kinds of outlet pressure of the coolant for the nuclear reactor.

Each line of FIG. 4 shows the cycle efficiency such that one point chain line is the full condensation cycle reactor, broken line is the non-condensation cycle reactor, and real linear is the nuclear reactor plant of the present invention (the partial condensation cycle reactor).

A calculating condition shown in the following table.2 is used to evaluate the cycle efficiency of each type of the nuclear reactor.

TABLE 2

|  | A full condensation cycle reactor | A non-condensation cycle reactor | The present invention |
| --- | --- | --- | --- |
| Outlet temperature of preliminary | — | 35 | 35 |

TABLE 2-continued

|  | A full condensation cycle reactor | A non-condensation cycle reactor | The present invention |
| --- | --- | --- | --- |
| cooling system (° C.) |  |  |  |
| Outlet temperature of intermediate cooling system (° C.) | — | 35 | — |
| Pressure of intermediate cooling system (MPa) | — | A compression ratio of two compressors | — |
| Outlet temperature of condenser (° C.) | 25 | — | 25 |
| Turbine efficiency (%) | 90 | 90 | 90 |
| Compressor efficiency (%) | — | 90 | 90 |
| Pump efficiency (%) | 95 | — | 90 |
| Pressure ratio of turbine (−) | pressure evacuation from turbine is invariable. | Pressure ratio of maximum efficiency | 3.5 (invariable) |
| Regenerative heat exchanger efficiency (%) | 90 | 90 | Regenerative heat exchanger I is 90%. Regenerative heat exchanger II is determined by following up I. |
| Condensation ratio (%) | — | — | Condensation ratio is set so that log-means temperature difference of regenerative heat exchanger II is 30° C. |

FIG. 4 verifies that the partial condensation cycle reactor of the nuclear reactor plant of the present invention is more excellent in cycle efficiency than that of both the non-condensation cycle reactor and the full condensation cycle reactor as long as both pressure and temperature of the coolant at outlet of the nuclear reactor is the value used for evaluating the cycle efficiency.

While one embodiment of the present invention was described in detail based on embodiment with specified example, the present invention is not restricted to aforementioned description. And any alternative way can be acceptable as long as it is not strayed from the category of the present invention.

As described above, the partial condensation cycle reactor of the present invention can gain effects to reduce a compressive work in gaseous layer and to reduce a heat evacuation from condenser by using carbon dioxide as the coolant for appropriately setting a condensation ratio of carbon dioxide. Thus, the cycle efficiency of the partial condensation cycle reactor can be more improved than that of both the non-condensation cycle reactor and the full condensation reactor as previous case. Consequently, a nuclear reactor of the present invention can gain a higher efficiency than that of the conventional thermal reactor and the fast reactor. Or said nuclear reactor can gain the same efficiency as that of the conventional thermal reactor and fast reactor even under the condition that the temperature is lower. (See the following claim 1 and claim 2)

In addition, the coolant is heated in a nuclear reactor for directly rotating the turbine to drive a power generator.

Accordingly, an intermediate cooling system is not necessary and thus a constitution itself of a power generating plant can be simplified. Further, Simplifying a constitution allows maintenance and operation to be also simplified. (See the following claim 1 and claim 2).

Furthermore, when a fast reactor is applied to the present invention as a nuclear reactor for a nuclear reactor plant, the nuclear reactor plant can be gained such that the cycle efficiency is more effective than that of conventional one (See the following claim 3).

What is more, when a thermal reactor is applied to the present invention as the nuclear reactor for the nuclear reactor plant, the nuclear reactor plant can be gained such that the cycle efficiency is more effective than that of conventional one (See the following claim 4).

What is claimed is:

1. A nuclear reactor plant, comprising;
    a nuclear reactor adapted to heat a coolant in a super critical state, wherein said coolant is carbon dioxide;
    a turbine adapted to be driven by the coolant heated by the nuclear reactor, wherein said coolant is discharged from said turbine in a gaseous state;
    means for compressing the coolant discharged from said turbine into the super critical state, wherein the coolant in the super critical state is provided to said nuclear reactor, and
    wherein said means for compressing the coolant discharged from said turbine divides the coolant in the gaseous state into a first predetermined amount of the coolant which is liquefied into a liquid state and then compressed into the super critical state from the liquid state, and a second predetermined amount of the gaseous coolant which is compressed into the super critical state from the gaseous state.

2. The nuclear reactor plant as set forth in claim 1, comprising wherein said means for compressing the coolant discharged from said turbine:
    a first regenerative heat exchanger adapted chill the coolant in the gaseous state discharged from said turbine;
    a second regenerative heat exchanger adapted chill the coolant in the gaseous state discharged from said first regenerative heat exchanger;
    a first compressor adapted to compress the coolant in the gaseous state discharged from said second regenerative heat exchanger, wherein the coolant in the gaseous state discharged from said first compressor is divided into said first and second predetermined amounts;
    a second compressor adapted to compress said second predetermined amount of the coolant in the gaseous state into the super critical state;
    a condenser adapted to receive and liquefy said first predetermined amount of the coolant in the gaseous state; and
    a pump adapted compress said first predetermined amount of the coolant in the liquid state from said condenser into the super critical state, and
    wherein said first predetermined amount of the coolant in the super critical state discharged from said pump is passed through said first regenerative heat exchanger and combined said second predetermined amount of the coolant in the super critical state discharged from said second compressor, and said first and second predetermined amounts of the coolant in the super critical state are passed through said first regenerative heat exchanger and provided to said nuclear reactor.

3. The nuclear reactor plant as set forth in claim 1 or 2 is characterized in that a fast reactor is applied as said nuclear rector.

4. The nuclear reactor plant as set forth in claim 1 or 2 is characterized in that a thermal reactor is applied as said nuclear reactor.

* * * * *